United States Patent [19]

Thimons et al.

[11] 4,055,074

[45] Oct. 25, 1977

[54] WINDOW METHOD FOR MEASURING LEAKAGE

[75] Inventors: Edward D. Thimons, Natrona Heights; Robert P. Vinson, Pittsburgh; Fred N. Kissell, Pittsburgh; Albert Tall, Pittsburgh, all of Pa.

[73] Assignee: The United States of America as represented by the Secretary of the Interior, Washington, D.C.

[21] Appl. No.: 755,916

[22] Filed: Dec. 30, 1976

[51] Int. Cl.$^2$ ............................................. G01M 3/26
[52] U.S. Cl. .......................................... 73/40; 98/50; 165/11
[58] Field of Search ............ 73/40, 46, 194 R, 40.5 R; 98/50; 62/125; 165/11

[56] References Cited

U.S. PATENT DOCUMENTS

| 2,936,618 | 5/1960 | Milam | 73/194 R |
| 3,451,259 | 6/1969 | McNulty | 73/40.5 R |

Primary Examiner—Donald O. Woodiel
Attorney, Agent, or Firm—Thomas Zack; Donald A. Gardiner

[57] ABSTRACT

A method of measuring fluid leakage around or through a barrier. In the preferred embodiment, the leakage measured was around a permanent mine stopping. To make the measurements a temporary test stopping with two windows was erected near the permanent stopping under observation. It is not necessary that the test stopping be leak-free. The first of the two windows has a known cross-section area and the second window also has a known cross-section area. To practice our invention, an anemometer is used to measure the flow through the first hole before the second hole or window is opened. Then the flow through this same window is measured when both holes are open. Next, the flow through the second hole is measured when both holes are open. Using these three measurements and the principles of fluid dynamics, the total leakage past the permanent stopping can be mathematically determined.

6 Claims, 1 Drawing Figure

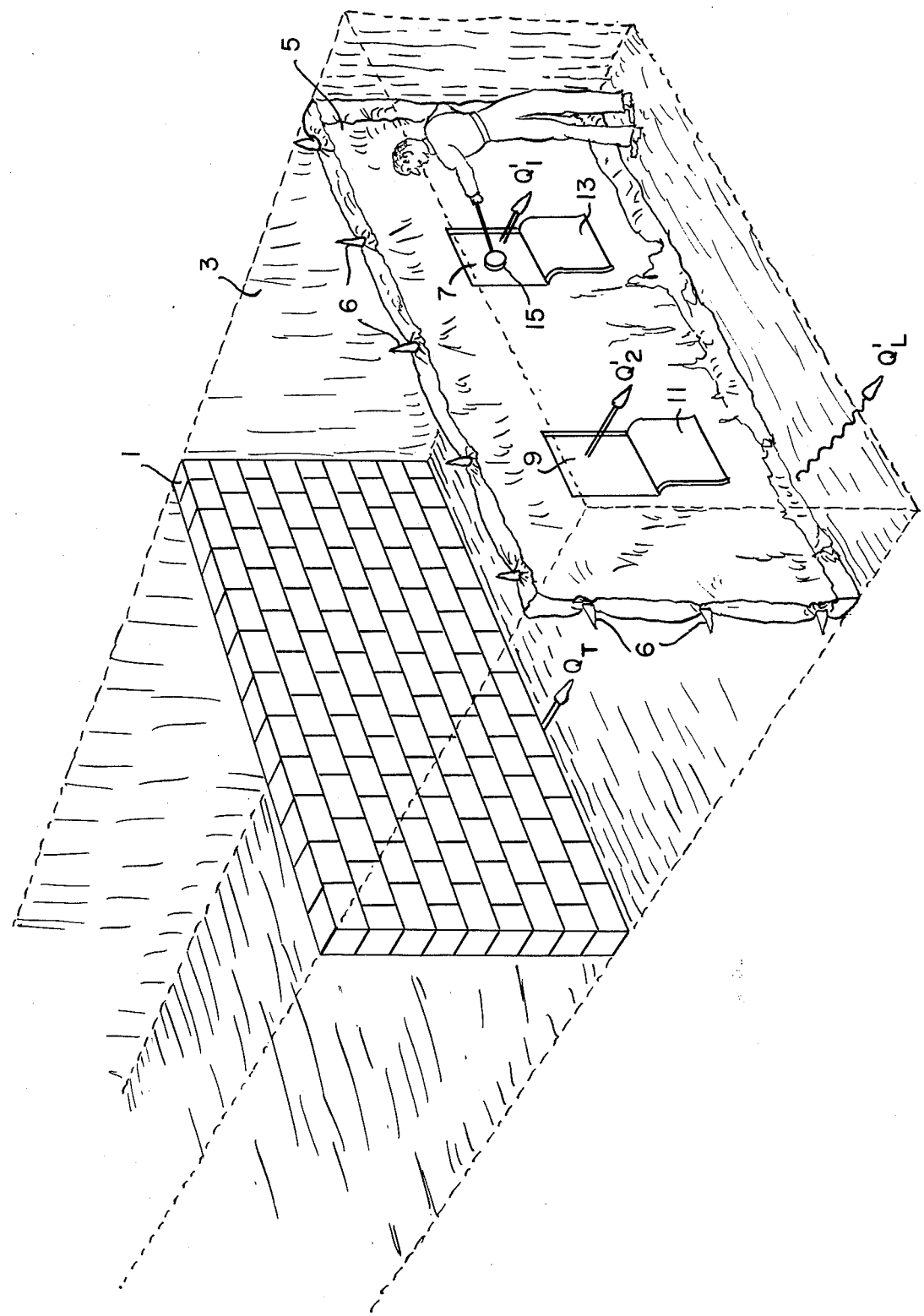

WINDOW METHOD FOR MEASURING LEAKAGE

BACKGROUND OF THE INVENTION

1. Field of the Invention

Our invention is a method for measuring and then determining the total fluid flow and/or its leakage past a barrier.

2. Description of the Prior Art

In many prior art fluid flow measuring devices, the total flow is measured directly. An example of this type of "primary" device is the U.S. Pat. No. 2,936,618 to Milam. Other prior art fluid flow measuring devices indirectly determine fluid flow by monitoring the performance of one or more primary fluid flow measuring devices. Examples of this second class of devices can be found in the U.S. Pat. Nos. 3,711,689 to Park, 3,739,159 to Nalley, and 3,831,447 to Nogita et al. Our invention would fall into the direct or "primary" fluid flow measuring group but with some very important distinctions.

With most direct fluid flow measuring devices, the total flow is generally measured and it assumed any unmeasured leakage past the device is negligible. Where some leakage does exist, normally this leakage is considered to be a constant fixed fraction of the total flow. An ammeter with a shunt is such a device. Assuming the shunted fraction is a fixed fraction of the total flow, this allows the device—like an ammeter—to read the total. When the method of our invention is practiced, the total fluid flow is not directly measured. Moreover, an unknown fraction leaks past the device. This unknown fraction can vary from measurement to measurement. What we do is determine the value of this unknown fraction and then compute the total flow. A complete understanding of the invention will follow from the description thereof hereinafter.

The main advantage of this invention is that it is not necessary to construct a test stopping or barrier which is completely leak-free. The procedures set forth in this invention allow one to calculate the leakage of air around the test barrier and then by summing all the airflow passing through or around the test barrier, to calculate the leakage through the permanent barrier under observation.

SUMMARY OF THE INVENTION

The method of our invention used to measure leakage past a barrier such as a mine stopping consists of the steps of: (a) setting up a test stopping with two windows of known cross-section area near the permanent stopping whose leakage is to be measured; (b) measuring the flow through one of the windows when the second one is closed; measuring the flow through the same window when both windows are open; measuring the flow through the second window when both windows are open; and (c) calculating the leakage past the permanent stopping based on the three measurements taken.

The primary object of this invention is an improved method for determining fluid leakage past a barrier.

BRIEF DESCRIPTION OF THE DRAWING

The FIGURE schematically illustrates how the apparatus to practice our invention could be set up in conjunction with a permanent mine stopping.

Development of this invention began with the desire to measure the amount of air leakage past a mine stopping. The FIGURE illustrates a typical vertically disposed permanent stopping 1 made of cinder blocks which extends completely across the width and height of the mine passage 3. To those familiar with the use of mine stoppings to control the air flow within mines for ventilation and safety purposes, it is well known that these stoppings can assume various configurations with different types of materials being used for their construction. Panels of overlapping or joined free hanging sheets made of canvas, plastic, or any air impervious material have frequently been used. Wood may also be used. The details of this particular stopping used forms no part of this invention and, therefore, may vary as desired.

Within the same mine passage near the permanent stopping is erected a vertically disposed temporary test stopping 5. Around the periphery of the test stopping are a plurality of spaced spike fasteners 6 for holding the stopping upright against the mine walls. As shown, these fasteners engage the walls, floor, and roof of the mine passage. Other types of fasteners to retain the stopping could also be used. This test stopping or second barrier would receive all the air leakage $Q_T$ that passes through or around the permanent stopping. It is this leakage which we desire to measure. Test stopping 5 is made of a cloth fabric which is generally air impervious except for two windows 7 and 9 each of which have holes of known cross-sectional area that may be used as measurement openings. Test stopping 5 leaks at its perimeter where it contacts the mine walls. Flaps 11 and 13 allow the openings 7 and 9 to be either totally open, as shown, or either or both may be shut. As shown, these window openings are in their open states in fluid communication with the volume between the permanent stopping and test stopping barriers. A typical hole size ranges between $\frac{1}{2}$ ft.$^2$ and 2 ft.$^2$, although it can be larger or smaller.

One of the practical limitations placed upon the size of the stopping opening is that it must be useable with the fluid flow measuring anemometer 15. In one working embodiment, the anemometer used to measure the velocity of air in feet per minute was model A/2-4 manufactured by Davis Instrument Co. of Baltimore, Md. The airflow in cubic feet per minute is equal to the velocity times the cross-sectional area of the hole. With this type of meter, it is possible to measure the air flow $Q_1$ through the first hole (window 7) before the second hole is opened; the flow $Q_1'$ through the first hole when both holes are open; and the flow $Q_2'$ through the second hole (window 9) when both holes are open. Other useful representations include the letters $Q_L$ to indicate the leakage past the test stopping barrier 5 when only the first hole is open and $Q_L'$ to indicate the leakage past the test stopping when both holes are open.

From a mathematical viewpoint it can be shown that:

(1) $Q_1 + Q_L = Q_T$ with the hole (window 7) opened and
(2) $Q_1' + Q_2' + Q_L' = Q_T$ with both window holes opened.

If equation (2) is subtracted from equation (1) we get:

(3) $Q_1 + Q_L - Q_1' - Q_2' - Q_L' = 0$

At the time the second window hole is opened—following the opening of the first window hole—there is a decrease in the flow rate through the first hole. This percentage decrease in flow is equal to the percentage decrease in the leakage around the temporary test stopping 5. Or mathematically:

$$(4) \frac{Q_1}{Q'_1} = \frac{Q_L}{Q'_L} \text{ or } (5) Q'_L = Q_L \frac{Q'_1}{Q_1}$$

Substituting equation (5) into equation (3) yields:

$$Q_1 + Q_L - Q'_1 - Q'_2 - Q_L \frac{Q'_1}{Q_1} = 0 \quad (6)$$

Since the quantities $Q_1$, $Q_1'$, and $Q_2'$ can be measured, the only unknown in equation (6) is $Q_L$. Knowing its value after the measurements are made allows $Q_T$ to be determined by the relationship:

$$(7) \; Q_T = Q_L + Q_1$$

The basis for assuming (equation (4)) the percentage decrease in flow rate is equal to the percentage decrease in the flow rate leakage around the stopping 5, is simple. When the test stopping or barrier 5 is erected, the airflow is restricted at this barrier, i.e., it must flow through the first hole and the leakage holes. This causes an air pressure drop across the barrier. The amount of flow through these holes is related to the amount of pressure drop by the Bernoulli equation, a well known law of fluid flow. This same law which applies to the hole of window 7 also applies to what may collectively be called the leakage hole but which is actually many small holes around the perimeter of the test stopping. When the second hole in window 9 is opened, the airflow is less restricted and the pressure drop across the test stopping 5 falls. Thus the pressure drop decrease at the hole of window 7 is the same as the pressure drop decrease at the collective leakage hole. If the flow-pressure proportionality from the basic laws of fluid flow are the same for each of the window and leakage holes, then the percentage decrease in flow must be the same.

For our invention to work as outlined, we presuppose the flow rate through the permanent stopping or barrier is constant and that the leakage through the primary permanent barrier 1 remains constant when the secondary test barrier 5 is erected, the measurement ($Q_1$) made, the second hole opened, and the measurements ($Q_1'$ and $Q_2'$) made. Either laminar or turbulent fluid flow may work with our invention. However, in actual point of fact with the preferred embodiment, the flow is always turbulent, due to the restrictions caused by the two barriers.

The principles of our invention have a considerably wider application than the mine stopping embodiment illustrated and described. They may be employed in any fluid flow measurement situation where it is desired to measure leakage and/or total fluid flow. Two such examples are the flow of water in large conduits or streams, or the flow of air in tunnels or large rooms. In any instance where because of cost or time it is impossible to erect a test barrier which has no leaks, then the principles set forth in this invention may be used.

None of the specific details of the preferred embodiment or other embodiments disclosed are to be used to limit the scope and extent of our invention which is to be measured only by the scope and spirit of the claims which follow.

We claim:

1. A method for measuring fluid leakage past a first barrier comprising the steps of:
   a. setting up a test stopping barrier near the first barrier whose leakage is to be measured, said barrier having two windows therein capable of being opened or closed;
   b. measuring the fluid flow rate through the first of said opened windows while the second window remains closed; measuring the fluid flow rate through the same first window with both windows open; measuring the fluid flow rate through the second window when both windows are opened; and
   c. calculating the total fluid flow leakage past the first barrier under observation based upon the three foregoing measurements.

2. The method of claim 1 wherein said setting up step (a) is made so that the test stopping barrier is placed so that all of the leakage from the permanent barrier being measured passes through or leaks around the test barrier.

3. The method of claim 1 wherein the measurements of step (b) are made with an anemometer.

4. The method of claim 1 wherein the calculations of step (c) assume the percentile decrease in fluid flow through the first window will be equal to the percentile decrease in leakage around the stopping barrier when step (b) is performed.

5. The method of claim 1 wherein steps (a), (b), and (c) are performed in that order.

6. The method of claim 1 wherein said first barrier is a mine stopping and said test stopping barrier is a barrier adjacent to it in the mine passage.

* * * * *